United States Patent
Pettersson

[11] Patent Number: 5,287,629
[45] Date of Patent: Feb. 22, 1994

[54] MACHINE STAND, PARTICULARLY FOR SO-CALLED COORDINATE MEASURING MACHINES, AND A METHOD FOR CONSTRUCTING THE STAND

[75] Inventor: Bo Pettersson, Torshälla, Sweden

[73] Assignee: C. E. Johansson AB, Eskilstuna, Sweden

[21] Appl. No.: 907,316

[22] Filed: Jul. 1, 1992

[30] Foreign Application Priority Data

Jul. 9, 1991 [SE] Sweden .................................. 9102153

[51] Int. Cl.$^5$ .................... G01B 7/03; G01B 11/03; G01B 21/04
[52] U.S. Cl. ........................................ 33/503; 33/1 M
[58] Field of Search ............... 33/1 M, 502, 503, 504, 33/505

[56] References Cited

U.S. PATENT DOCUMENTS

| | | | |
|---|---|---|---|
| 4,782,598 | 11/1988 | Guarini | 33/503 |
| 4,908,951 | 3/1990 | Gurny | 33/503 |
| 4,910,446 | 3/1990 | McMurtry et al. | 33/503 |
| 4,953,306 | 9/1990 | Weckenmann et al. | 33/503 |
| 4,964,221 | 10/1990 | Breyer et al. | 33/503 |
| 5,119,566 | 6/1992 | Schalz et al. | 33/503 |

FOREIGN PATENT DOCUMENTS

238711 11/1985 Japan .................................. 33/503

*Primary Examiner*—William A. Cuchlinski, Jr.
*Assistant Examiner*—C. W. Fulton
*Attorney, Agent, or Firm*—Nies, Kurz, Bergert & Tamburro

[57] ABSTRACT

A machine stand and a method of constructing it particularly a machine stand for so-called coordinate measuring machines. The machine includes one or more vertical legs, one or more horizontal beams, and a rod or bar which is mounted on a horizontal beam and intended to carry a measuring head tool or the like. At least one vertical leg is supported by a base element. The vertical leg supports at least one beam, and the rod can be moved to any selected point within the space volume defined by the stand by moving the leg, the beam and the rod relative to the base element. At least one vertical leg is mounted relative to the base element so as to be flexurally rigid and non-rotatable about its longitudinal axis; the beam or beams are not non-rotatably and flexurally rigidly connected, so that a yielding structure is obtained. Deformation of the first vertical leg is measured by measuring means, so as to be able to determine deformation of the structure.

24 Claims, 5 Drawing Sheets

MACHINE STAND, PARTICULARLY FOR SO-CALLED COORDINATE MEASURING MACHINES, AND A METHOD FOR CONSTRUCTING THE STAND

BACKGROUND OF THE INVENTION

1. Field of the Invention

The present invention relates to a method of constructing a machine stand, particularly a machine stand for so-called coordinate measuring machines. The invention also relates to such a machine stand.

The present invention relates to a method pertaining to the optical measurement of surfaces, particularly in conjunction with measuring optically the shape or configuration of a measurement object with the aid of so-called coordinate measuring machines. The invention also relates to an arrangement for carrying out the method.

2. Description of the Related Art

Coordinate measuring machines are used to measure the shape or configuration of an object, wherein a very large number of points on the object are measured with regard to their positions in a three-dimensional coordinate system defined by the machine. A coordinate measuring machine has a measuring head which can be moved in three mutually perpendicular directions. The measuring head carries a measuring probe whose position in relation to a surface of the object is determined in the coordinate system defined by said three mutually perpendicular directions. Such coordinate measuring machines are extremely accurate and consequently deformations in the various parts of the machine will influence the measuring result.

This problem is solved by means of the present invention.

SUMMARY OF THE INVENTION

The present invention thus relates to a method of constructing a machine stand, particularly a machine stand for so-called coordinate measuring machines, which comprises one or more vertical legs, one or more horizontal beams and a rod or the like which is attached to one beam and which carries a measuring head or a tool or the like, wherein at least one vertical leg is carried by a base element, wherein said leg at least supports a beam, and wherein said rod can be moved to any desired point within the space volume defined by the machine stand, by moving said leg, said beam or beams and said rod relative to said base element, and is characterized in that at least one of said vertical legs, a first leg, is made non-twistable and non-bendable in relation to said base element; and in that said beam or beams is/are not non-twistably and non-bendably connected, in order to provide a yieldable structure.

According to one preferred embodiment of the invention, a measuring device functions to measure deformation in the vertical leg and therewith enable deformation of the structure to be determined.

The invention also relates to an apparatus of the aforesaid kind.

BRIEF DESCRIPTION OF THE DRAWINGS

The invention will now be described in more detail with reference to the accompanying drawings which illustrate different cases of deformation and an exemplifying embodiment of the invention, in which.

DESCRIPTION OF THE PREFERRED EMBODIMENTS

Figures 1, 2:
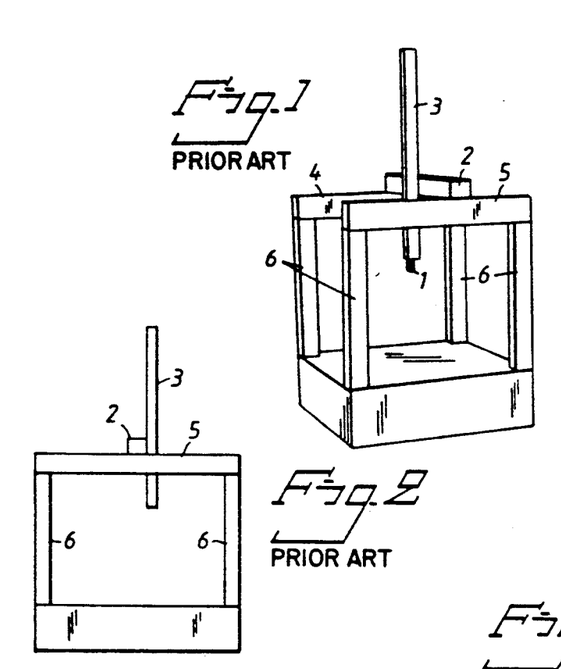
FIG. 1 illustrates a known coordinate measuring machine.
FIG. 2 illustrates the machine of FIG. 1 seen from one end thereof.

FIG. 1 illustrates schematically a first type of coordinate measuring machine, namely a Gantry-type machine. A measuring probe 1 can be moved along three mutually perpendicular coordinate axes X, Y and Z. The machine is constructed of four vertical legs 6 on which two beams 4, 5 are firmly mounted. A crosspiece in the form of a further beam 2 is displaceably mounted for movement in the direction of the longitudinal axis of the beams 4, 5, i.e. for movement in the Y-direction. A rod or bar 3 is displaceably attached to the crosspiece 2 in a manner to allow the rod to be moved vertically, i.e. in the Z-direction, and also to allow the rod to be moved in the direction of the longitudinal axis of the crosspiece 2, i.e. in the X-direction.

The measuring probe 1 is attached to the bottom end of the rod 3. Provided on each of the beams 4, 5, the crosspiece 2 and the rod or bar 3 is a respective measuring scale, said scales being disposed in direct connection with the beams and the crosspiece respectively so as to indicate the relative position, which gives the position of the measuring probe 1 in the coordinate system.

Since a coordinate measuring machine is intended to determine the measurements of a measurement object with extreme accuracy, it is extremely important to know the deformations to which the beam system is subjected under different conditions, so that the measuring result can be adjusted by making a correction corresponding to the deformations.

The deformations can be divided into three main groups, which depend on the cause of the deformations:

1. Static deformation due to shifting of the centre-of-gravity position of the moveable X, Y, Z system.

2. Dynamic stresses due to mass forces occurring upon acceleration of the moveable X, Y, Z system.

3. Changes occurring in the beam system as a result of temperature variations.

The invention relates primarily to the types of deformation recited under 1 and 2 above. With regard to the type-3 deformations recited above, the present invention eliminates thermal stresses.

The aforesaid deformations result in changes in machine geometry and in beam straightness and also cause the origin of the coordinate system to shift.

Described below are deformations that occur in a measuring machine of the aforesaid Gantry-type, comprising said horizontal beams 4, 5 and said legs 6, although it will be understood that the principles are also applicable to other types of coordinate measuring machines.

Figure 3A:
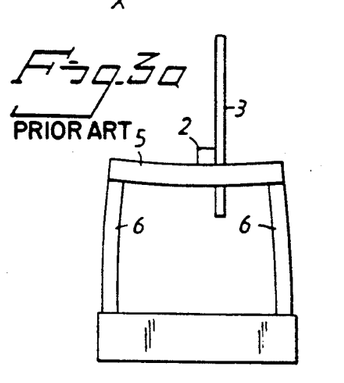
FIGS. 3a, 3b and 4 illustrate respectively three machine-loading cases.
Figure 3B:
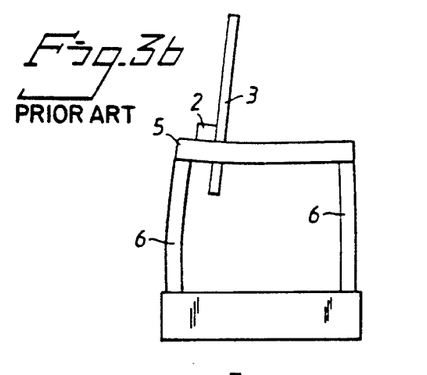

FIG. 2 illustrates the machine shown in FIG. 1 schematically from one end-wall of the machine in FIG. 1. This end-wall will be deformed as a result of the weight of the X/Z-system 2, 3, this deformation being shown greatly exaggerated in FIGS. 3a and 3b. A comparison between FIGS. 3a and 3b will show that the occurrent deformation is dependent on the location of the X/Z-system 2, 3 along the beam 5. As will be seen from FIG. 3b, when the X/Z-system is not coincident with the symmetry position along the beam 5, the position of the rod 3 will not coincide with the vertical. This means that the measuring probe will be displaced both in the Z-direction and the Y-direction.

Figure 4:
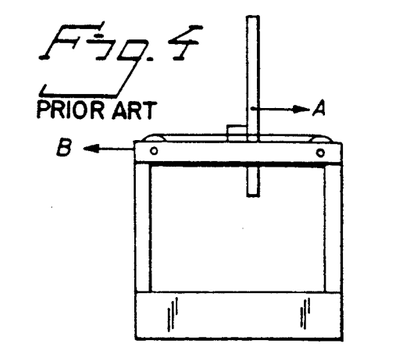

When the X/Y-system 2, 3 is accelerated in the direction of the arrow A in FIG. 4, there is obtained in the beam system 5, 6 a reaction force which tends to deform said end-wall in an opposite direction, in the direction of arrow B. This causes the system origin to shift in the direction of arrow B, among other things.

With knowledge of the weight of the moveable system 2, 3, its position along the Y-axis and the instantaneous acceleration, it is, of course, possible theoretically to calculate the instant deformation of the machine end-wall at each moment in time. This is highly complicated in practice, however, and the calculations that must be carried out are uncertain. For example, the legs 6 are subjected to bending forces by the torque that occurs as a result of bending of the beam 5, which in turn is subjected to bending by spread load, punctiform loading and torque. Dynamic loads must also be added to the influence caused by the aforesaid forces.

In reality, the deformation will also be influenced by inhomogenous material parameters, such as beam wall-thicknesses, variations in mechanical strength properties, etc. The deformation is also contingent on resiliency and delays, among other things, which makes it difficult to obtain reliable values relating to accelerations of the moveable system.

Figure 5:
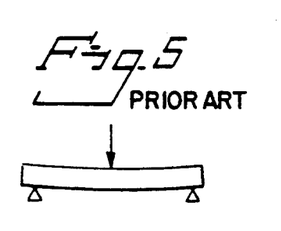
FIG. 5 illustrates loading of the machine frame.

In a system of the kind illustrated in FIG. 5, in which the beam is a freely-placed beam, the calculation problem is reduced to a simple elementary case.

Figure 6:
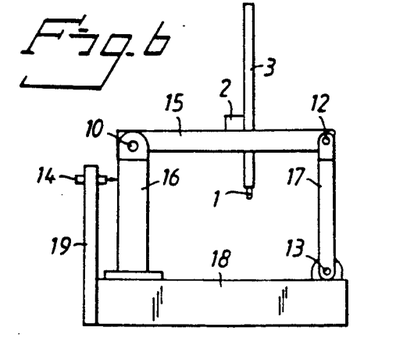
FIG. 6 illustrates a machine frame constructed in accordance with the invention.

FIG. 6 illustrates one method of achieving this with a Gantry-type machine. The other end-wall of the machine is constructed in a corresponding manner. In this construction of the inventive machine, the legs 6 are constructed differently to the legs of the FIGS. 1 and 2 embodiments. One of the legs 16, which exemplifies the aforesaid first leg, has the form of an extremely robust or strong column which defines the origin of the coordinate system and which is able to take-up large horizontal forces with only slight deformation. The beam 15 is pivotally mounted on legs 16 and 17 by means of respective pivot journals 10 and 12. The other leg 17 of the illustrated embodiment is intended to take-up solely vertical forces and is pivotally mounted to the base element 18 of the machine. The beam 15 is pivotally mounted solely for movement in the plane of the paper in FIG. 6 and is rigid against movements perpendicular to the plane of the paper.

In the case of this embodiment, calculations can be restricted to the simple case of a "freely placed beam", since the beam will be deformed as a freely-placed beam according to FIG. 5.

The rigid leg 16 can be given large dimensions, so as to prevent shifting of the origin point. This applies particularly to dynamic loads at high accelerations.

In order to avoid dimensioning the leg 16 excessively so as to prevent shifting of the origin, it is possible in accordance with one preferred embodiment to instead permit bending of the leg 16 and to measure bending of said leg with the aid of a sensor 14. The sensor 14 can be constructed so as to act between the leg 16 and a reference beam 19 whose position in relation to the base element 18 is determined with great precision.

It will therefore be obvious that by constructing a Gantry-type measuring machine in the manner illustrated in FIG. 6, only simple calculations will be required in order to correct the measurement errors caused by deformation. Furthermore, the deformation of the leg 16 can be measured, whereby other movements of the component members 15, 3, 17 can be calculated accurately, since these members are not deformed but are merely positionally displaced as a result of being pivotally attached, and are thus not subjected to torque.

Thus, according to one preferred embodiment of the invention, the aforesaid beam or beams and legs can be pivotally connected to one another and to said first leg.

According to another preferred embodiment, some of the aforesaid pivot journals will act in only one plane.

According to a further preferred embodiment, said beams and legs, with the exception of said first leg, are secured at their attachment points in a torque-free fashion.

According to another preferred embodiment, the attachment of all beams is such that their loading state will be in accordance with an elementary loading state.

Figures 7A, 7B, 7C, 7D, 7E, 7F, 7G, 7H:
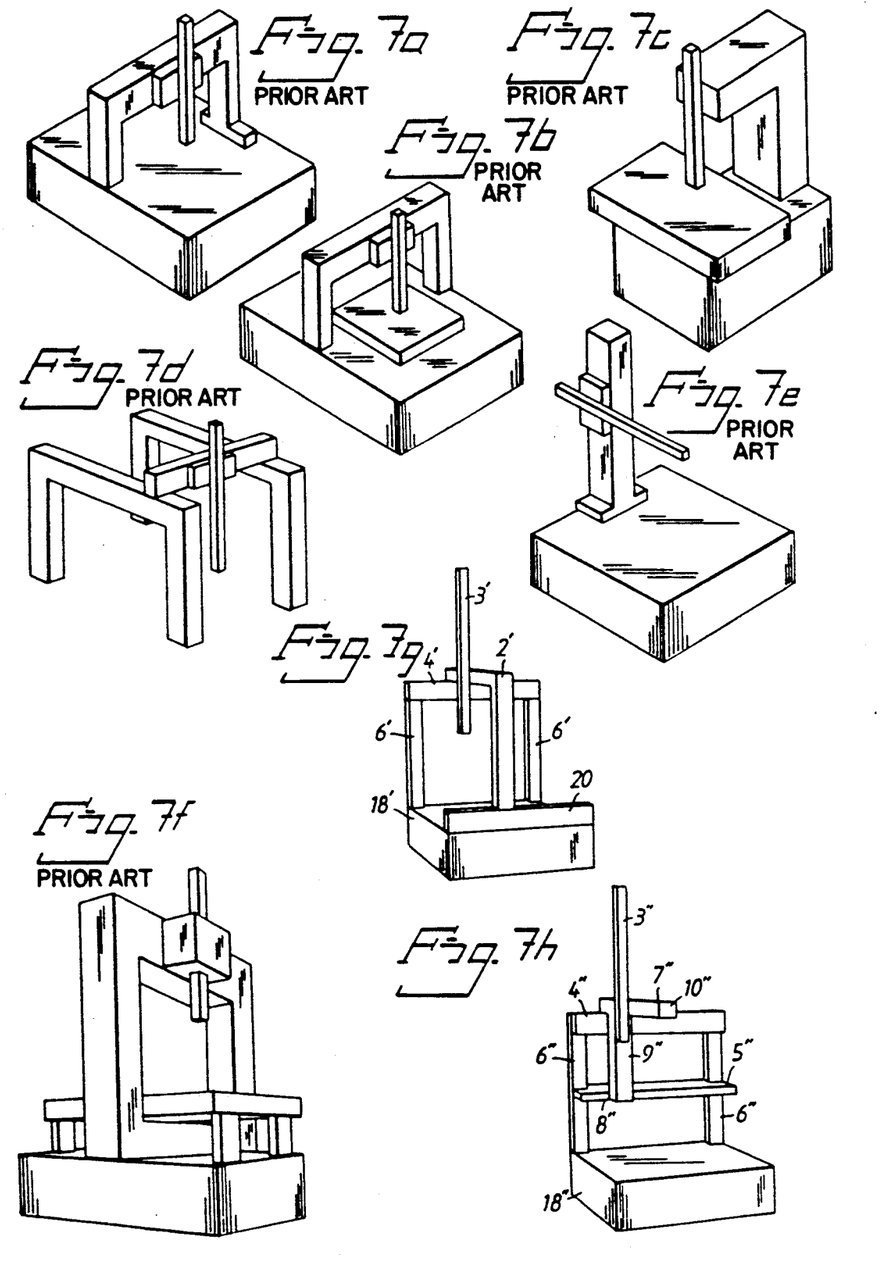
FIGS. 7a-7h illustrate different types of coordinate measuring machines.

The invention has been exemplified in the aforegoing with reference to a Gantry machine. It will be understood, however, that the invention can be applied to other types of measuring machines. FIGS. 7a to 7f illustrate schematically different types of commercially available measuring machines of the kind to which the invention refers. FIG. 7a illustrates a portal machine having a moveable portal, while FIG. 7b illustrates a portal machine having a fixed portal. FIG. 7c illustrates a column machine. FIG. 7d illustrates a Gantry-type machine. FIG. 7e illustrates a machine having a horizontally projecting arm. FIG. 7f illustrates a so-called ring-bridge machine.

FIGS. 7g and 7h illustrate two novel types of measuring machines, wherein the machine illustrated in FIG. 7g is a type of portal machine and wherein the machine illustrated in FIG. 7h is of the so-called Cantilever type.

The machine illustrated in FIG. 7g includes a base element 18'. Resting on the base element 18' are two legs 6', between which a beam 4' extends. An L-shaped portal 2' extends between the beam 4' and a horizontal beam 20 which rests on the base element 18'. A rod or bar 3' is vertically displaceable in relation to the L-shaped portal 2'. A measuring probe is mounted on the bottom end of the rod 3'.

The measuring machine illustrated in FIG. 7h includes a base element 18" which supports two legs 6". The legs support at different heights two horizontal beams 4" and 5". An L-shaped crosspiece 7" is supported by the beams 4", 5". The crosspiece has a vertical part 9" which abuts vertical surfaces on the beams 4", 5", and a horizontal part 10" which abuts the upper horizontal surface of the upper beam 4". The horizontal part 10" supports a vertically and horizontally displaceable rod or bar 3". A measuring probe is intended to be attached to the bottom end of the rod 3".

The present invention can be applied to all of the types of machines illustrated in FIGS. 7a to 7h, and also to types of machine that have not been shown.

The present invention can also be applied to types of machines other than the measuring machines illustrated here. For example, the invention can be applied to all machines in general that include a stand which shall be aligned accurately with an object, for example an object which is to be worked mechanically. The invention is therewith applied in the aforesaid and following manner to calculate deformations in the machine stand and thereafter to correct, for instance, the position of a working tool relative to the object. The present invention is therefore not restricted in application to any specific type of machine, even though the invention is primarily intended for application with measuring machines.

Figure 8A:
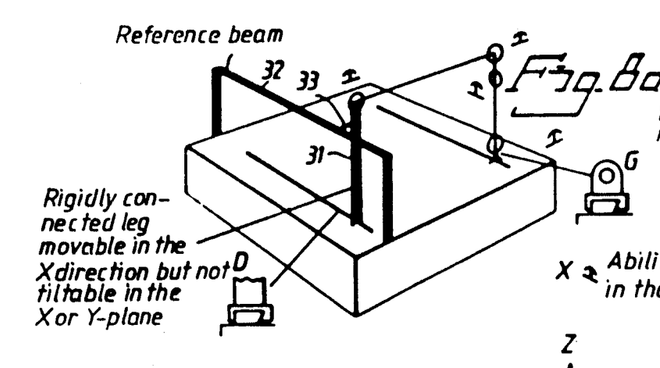
FIGS. 8a, 8d, 8f, 8g and 8h illustrate different embodiments of different coordinate measuring machines with which the invention is applied.
Figure 8B:
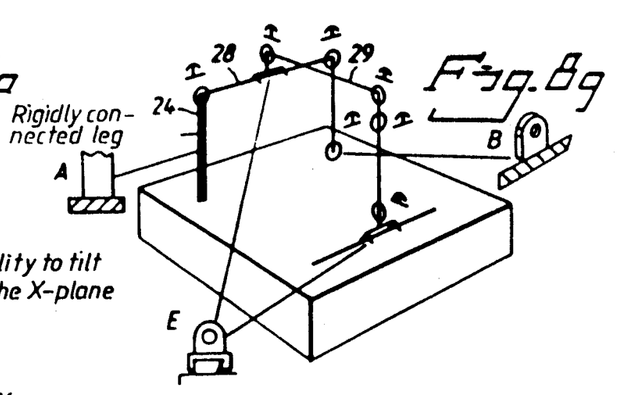
Figure 8C:
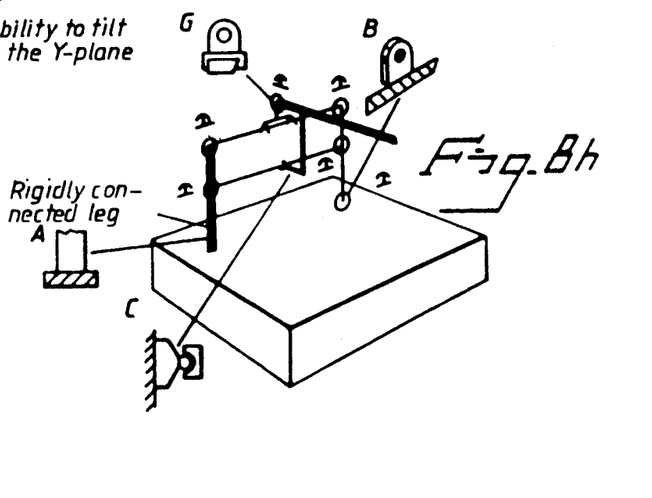
Figure 8D:
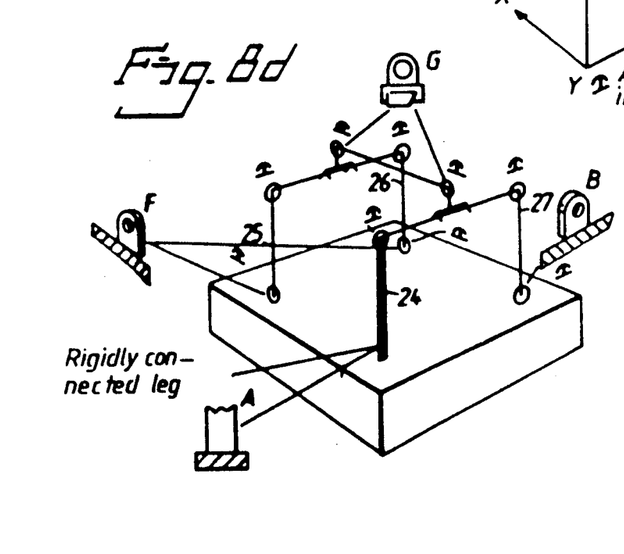
Figure 8F:
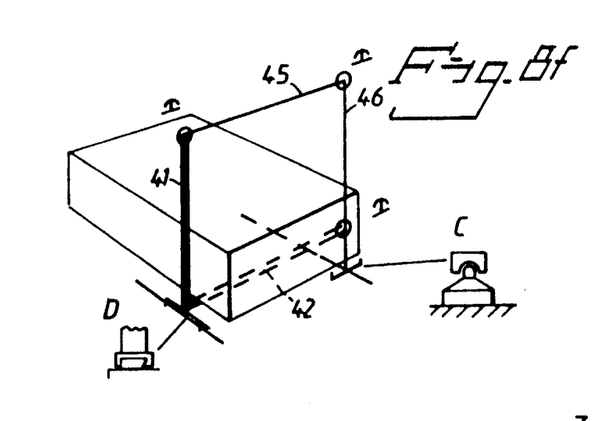
Figure 9A:
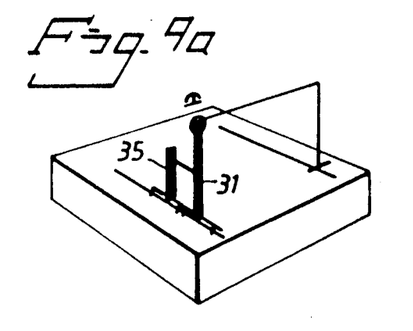
FIGS. 9a and 9f illustrate alternative embodiments.
Figure 9F:
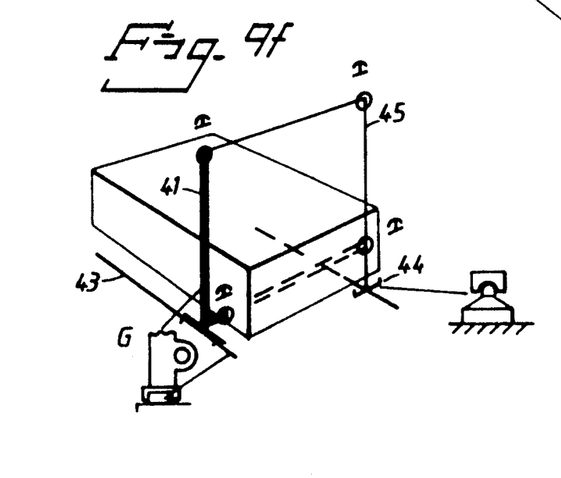
Figure 10A:
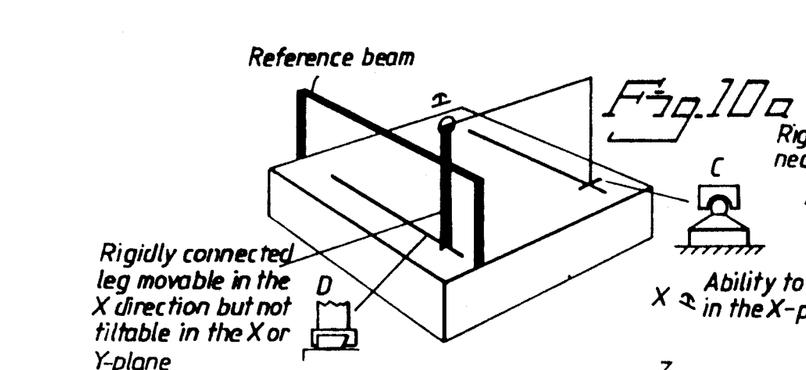
FIGS. 10a, 10d and 10g illustrate further alternative embodiments.
Figure 10B:
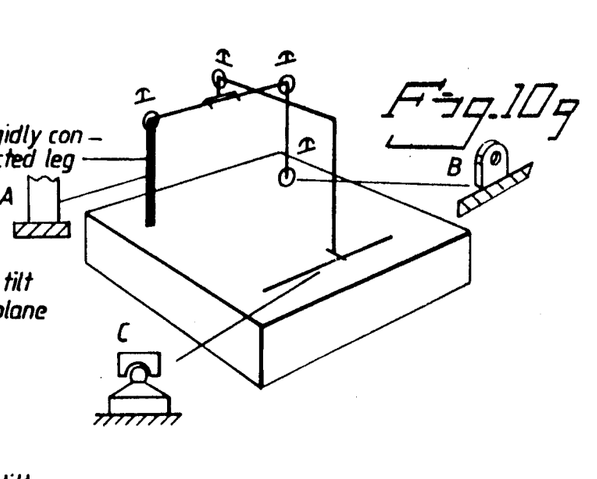
Figure 10D:
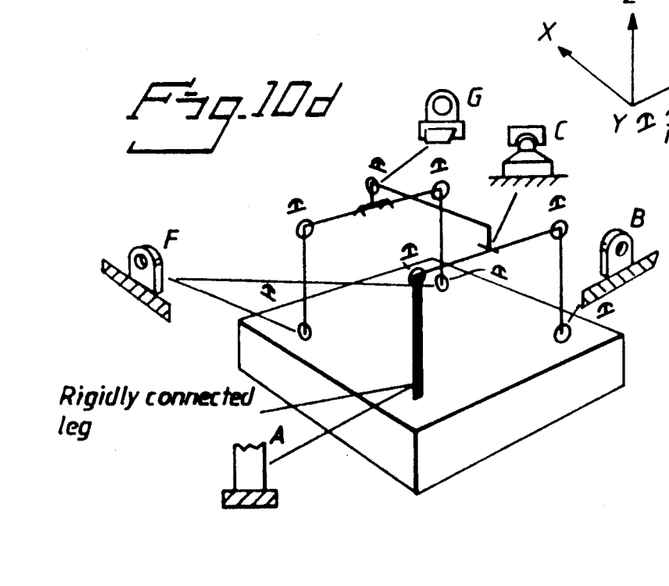

The manner in which the invention can be applied to certain types of measuring machine is exemplified in FIG. 8, FIG. 9 and FIG. 10 with the aid of symbols, namely the machine types illustrated in FIGS. 7a, 7d, 7f, 7g and 7h. In the FIGS. 8, FIGS. 9 and FIGS. 10, the common letters in the Figure designations are the same as those in the FIGS. 7. Thus, FIGS. 8a, 9a, and 10a relate to the type of machine illustrated in FIG. 7a.

The symbol used in FIGS. 8, 9 and 10 indicates the ability to tilt in the X-plane while the symbol indicates the ability to tilt in the Y-plane. Furthermore, the Figures show schematically and illustratively different symbols designated A to G which relate to different types of pivots. These symbols relate to:

A: A fixedly-mounted column.
B: Pivotal movement in the Y-plane.
C: Thrust ball-bearing, where the bearing is freely moveable in all directions in a plane perpendicular to the support direction.
D: Legs which are rigid in all directions but which can be displaced linearly in one direction.
E: Legs which are rigid in all directions but can be displaced linearly in one direction and where a connected beam is pivotal in a plane perpendicular to said direction of linear displacement.
F: Pivotal in the X-plane.
G: A pivot corresponding to E above but where a horizontal beam is journalled and displaceable along another horizontal beam.
H: A pivot corresponding to D above but where the leg has a pivot connection for a horizontal beam in a ring-bridge machine.

FIG. 8d illustrates a Gantry machine of the kind illustrated in FIG. 7a and in FIG. 1. As will be seen from FIG. 8d, only one leg 24 is fixed in relation to the base element, whereas the other three legs are pivotally connected to the base element. It will also be seen from FIG. 8d that two of the legs 25, 26 can move pivotally in the X-plane relative to the base element, while the leg 27 can move pivotally in the Y-plane relative to said base element. This means that both the beams reference 4 and 5 in FIG. 1 will behave as freely-placed beams, similar to the crosspiece reference 2.

FIG. 8g illustrates a machine of the kind shown in FIG. 7g, which is also provided with one leg 24 rigidly connected to the base element. The horizontal beam 28 will also behave as a freely-placed beam in this case. The L-shaped portal 29, which corresponds to the portal 2' in FIG. 7g, is pivoted for movement in the X-plane and is thus suspended in a torque-free fashion.

Deformations resulting in angular changes in the pivots and downward bending of the beam 28 can thus also be calculated easily with this type of machine.

According to one preferred embodiment, deformation of the first leg, which is rigidly mounted in relation to the base element, is measured with the aid of a mechanical or an electromechanical sensor or transducer acting on the leg.

Alternatively, the deformation can be measured with the aid of an optical or an electronic contactless sensor or transducer.

According to one preferred embodiment, deformation of the first leg is measured against a reference beam or a reference rod which is free from load and which extends along the path moved by the first leg.

Deformation of the first leg is preferably measured as the extent to which the leg bends outwards in one or more directions.

In some cases, it is also preferred to measure downward bending of one or more of the pivotally mounted beams, said measuring process preferably being effected against a load-free reference beam.

FIG. 8a illustrates a portal machine in which the leg 31 that is firmly affixed to the base element is able to move in the X-direction but is rigid in the X-plane and the Y-plane. The distance 33 to a non-loaded reference beam 32 which extends along the path through which the leg and the portal move constitutes a measurement of outward bending of the portal in the Y-direction. Outward bending of the portal in the X-direction can also be determined, e.g. in accordance with FIG. 9a which illustrates an alternative construction. According to one preferred method, illustrated in FIG. 9a, the arrangement includes a separate non-loaded measuring leg 35 which can be moved along the movement path of the leg 31. The measuring leg is connected to the leg 31 and accompanies movement of said leg in the direction of the X-axis. The measuring leg 35 can, of course, also be used to measure both outward bending of the leg 31 in the Y-plane and any possible obliqueness of the leg 31 in relation to the X-plane.

The aforesaid parameters can be measured by means of suitable, known measuring methods, such as optical methods, inductive methods or capacitive methods. Such measuring techniques are well known and will not be described in detail here.

Figure 11:
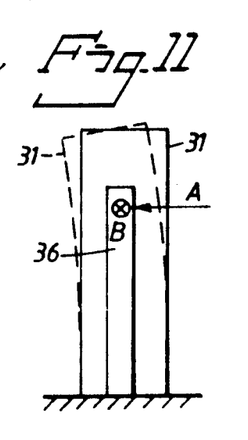
FIG. 11 illustrates the construction of a vertical leg provided with a sensor.

According to another preferred method, illustrated in FIG. 11, the leg referenced 31 in FIG. 8a is of hollow tubular construction, and a non-loaded leg 36 is disposed within the tubular leg 31. The distance from the non-loaded leg to the inner surface of the tubular leg is measured in two directions A and B, thereby measuring outward bending of the leg and any obliqueness that may occur. The non-loaded leg is moved with the leg 31 and thus forms a measurement-sensor zero reference. The reference beam 32 is not required in the embodiments illustrated in FIGS. 9a and 11.

This method can be used for types of machines that have a fixed control leg, or main leg, and types of machines in which the control leg can be moved in one direction.

FIG. 8h illustrates a Cantilever machine of the kind shown in FIG. 7h. It is evident from FIG. 8h, with symbols inserted, that torque-free attachment is also obtained in this case, thereby enabling deformations to be readily calculated. The Cantilever machine illustrated in FIG. 8h has a construction which is novel and preferred with this type of machine.

FIGS. 8f and 9f illustrate a ring-bridge machine. The difference between this type of machine and a portal machine is that the portal 41 forms a closed ring. The measuring machine table 42 is located above the lower beam of the portal 41 and the portal journal for movement in the X-direction. FIG. 8f illustrates a construction in which the lower horizontal beam 42 and the vertical main beam 41 form a rigid or stiff unit, whereas the other two beams 45, 46 are connected to the rigid unit by means of three pivot journals. FIG. 9f illustrates an alternative embodiment in which the vertical main beam 41 is journalled on an elongated guide 43 so as to be non-rotatable about its longitudinal axis. The reference 44 identifies a thrust bearing which takes-up forces that act vertically in the leg 45. This results in an attachment which is totally torque-free. Outward bending of the main beam 41 can be measured by any one of the aforedescribed methods.

One of the main concepts of the invention resides in the provision of a simple machine loading case, by introducing into the machine construction pivots and rigid parts such that all deformation of the beam elements, such as downward bending and outward bending of said elements, can be calculated with the aid of relatively simple analytical methods on the basis of known parameters, such as the positions of the various component parts, their weights and the acceleration forces to which they are subjected.

Another main concept of the invention in the aforesaid context resides in the further simplification of the necessary calculations, by establishing the magnitude of one or more of said down-bending and outward-bending of the beam element by direct measurement.

In the aforegoing, measurement methods have been described which include mechanical components, such as the reference beam 32. It is also possible, however, to use contactless measuring methods instead, for instance optical measuring methods, and thereby minimize the number and size of the mechanical components. For instance, the reference beam 32 can be replaced with a laser light beam, where a deviation from a straight line formed by the beam is detected by known photoelectric methods.

According to one preferred embodiment, the measuring system illustrated in FIG. 11 is modified by omitting the beam 36 and replacing said beam with a light beam which is directed upwardly in the tubular leg 31 and which is generated by a light source mounted in the bottom of said tubular leg. The beam is caused to illuminate a position-sensitive photodetector mounted in the upper part of the tubular leg. The output signal from the photodetector will therewith provide information concerning outward bending of the leg and also any obliqueness of the leg.

Figure 12:
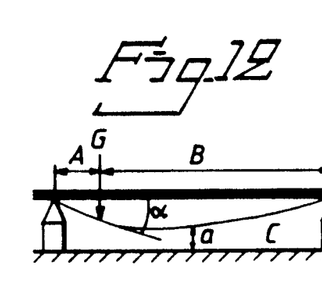
FIG. 12 illustrates a torque-free horizontal beam mounted in the stand.

FIG. 12 illustrates how downward bending of the horizontal beam can also be measured by, for instance, placing immediately beneath a horizontal beam forming part of the measuring machine a further horizontal, non-loaded beam which forms a reference beam. With this beam as a reference, downward bending of a horizontal beam can be measured at one or more points along the beam. By measuring downward bending of the beam at one or a number of positions along said beam, it is possible to obtain extremely accurate measuring results with regard to the configuration of the line C, which shows a downwardly bent beam greatly exaggerated, and therewith calculate the deflection $a$ from the horizontal plane for determining deviation of the probe tip from the vertical.

Alternatively, when having knowledge of all parameters, i.e. the lengths A and B in FIG. 12, where G indicates the position of the measuring probe, the moment of inertia of the beam and the modulus of elasticity of the beam material, it is possible to calculate the configuration of the line C with the aid of known equations. However, one of the problems concerned is that of having complete or thorough knowledge of the parameters involved. For instance, the wall thickness of the beam can vary along its length. Different measuring probes can have different weights, etc.

FIGS. 10g, 10a and 10d illustrate machines of the same types as those shown in FIGS. 8g, 8a and 8d, but with the exception that preferred simplifications have been made. Primarily, certain pivot journals that are moveable in only one plane have been replaced with ball-bearings in which the bearing is able to move freely in all directions with the exception of the supporting direction. This has enabled the omission of certain pivot journals. The constructions illustrated in the FIGS. 8 are simpler and less expensive to manufacture.

It is evident that the present invention solves the problem mentioned in the introduction, by including a number of pivot journals in the structure. It is also evident to the person skilled in this art that different types of machines can be constructed in different ways while applying the inventive concept, of which a number of methods has been described above.

It will also be understood that the present invention is not restricted to the illustrated and described embodiments thereof and that modifications can be made within the scope of the following claims.

I claim:

1. A machine stand, particularly a machine stand for so-called coordinate measuring machines, comprising: a base, at least one vertical leg supported by the base, a horizontal beam supported by said at least one vertical leg, a bar attached to the horizontal beam, and a measuring head carried by the bar, wherein said measuring head is movable to any selected point within a three-dimensional space volume defined by the stand by moving said beam and said bar in relation to the base, wherein one vertical leg is non-rotatably and flexurally rigidly attached to said base, measuring means for measuring lateral bending deformation of the rigidly attached vertical leg, and wherein said beam is not non-rotatably and flexurally rigidly connected to said rigidly attached vertical leg, to provide a structure in which deformations of elements of the structure can be readily calculated.

2. A stand according to claim 1, wherein said horizontal beam is connected to said at least one rigidly attached vertical leg by a pivot journal.

3. A stand according to claim 2, wherein said pivot journal permits movement of said horizontal beam solely in one plane.

4. A stand according to claim 1, wherein all connections but one between the base, the at least one vertical leg, and the horizontal beam are non-rigid connections that define attachment points that permit connections in a torque-free fashion.

5. A stand according to claim 1, wherein all horizontal beams are connected with vertical legs by non-rigid connections that define attachment points that permit connections in a torque-free fashion.

6. A stand according to claim 1, wherein said measuring means includes a mechanical sensor which acts on the rigidly attached vertical leg.

7. A stand according to claim 6, wherein the measuring means is positioned to measure against a nonloaded reference element.

8. A stand according to claim 1, wherein said measuring means includes an optical contactless sensor.

9. A stand according to claim 1, including measuring means for measuring downward bending of at least one pivotally mounted, preferably against a horizontal beam.

10. A stand according to claim 1, wherein said rigidly attached vertical leg is of tubular form and wherein a light source of an optical sensor is non-rotatably and flexurally rigidly attached within said tube adjacent the base, and wherein a position sensitive detector is mounted in an upper part of said tube so that a point of impingement on the detector of a beam transmitted by the light source indicates outward bending of the rigidity attached vertical leg in two mutually perpendicular directions.

11. A stand according to claim 1, wherein said measuring means includes an electromechanical sensor which acts on the rigidly attached vertical leg.

12. A stand according to claim 1, wherein said measuring means includes an electronic contactless sensor.

13. A method of constructing a machine stand, particularly a stand intended for so-called coordinate measuring machines, comprising the steps of:
a) providing a base;
b) non-rotatable and flexurally rigidly attaching a vertical leg to the base;
c) supporting a horizontal beam from the vertical leg with a rotatable and non-rigid connection between the horizontal beam and the vertical leg;
d) movably connecting with the horizontal beam a bar carrying a measuring head, wherein the measuring head is movable horizontally and vertically relative to the horizontal beam, so that the measuring head is positionable at any selected point within a three-dimensional space volume defined by the stand; and
e) during a coordinate measuring operation, measuring the lateral bending deformation of the rigidly attached vertical leg with a deflection measuring means to permit an accurate determination to be made of the position of the measuring head within the three-dimensional space volume.

14. A method according to claim 13, including the step of connecting said horizontal beam with said vertical leg by means of a pivot journal.

15. A method according to claim 14, wherein said pivot journal is operative to permit pivotal movement of the horizontal beam in only one plane.

16. A method according to claim 13, wherein all connections with the exception of the connection of the rigidly attached vertical leg are connected at their connection points in a torque-free fashion.

17. A method according to claim 13, wherein all horizontal beams are connected with vertical legs by non-rigid connections that define attachment points that permit connections in a torque-free fashion.

18. A method to claim 13, wherein said measuring step is performed by a mechanical sensor acting on the rigidly attached vertical leg.

19. A method according to claim 18, said measuring step includes measuring the deformation of said rigidly attached vertical leg against a non-loaded reference element.

20. A method according to claim 18, wherein the measuring step includes measuring downward bending of at least one pivotally journalled horizontal beam relative to a non-loaded reference beam.

21. A method according to claim 13, wherein said measuring step is performed by an optical contactless sensor.

22. A method according to claim 13, wherein said rigidly attached vertical leg is a vertically standing tube; and including the steps of providing a light source of an optical sensor rigidly attached within said tube; and providing a position-sensitive detector in the upper part of the tube, wherein the point of impingement of a beam transmitted by the light source onto the detector indicates outward bending of the leg in two mutually perpendicular directions.

23. A method according to claim 13, wherein said measuring means includes an electromechanical sensor which acts on the rigidly attached vertical leg.

24. A method according to claim 13, wherein said measuring means includes an electronic contactless sensor.

* * * * *

UNITED STATES PATENT AND TRADEMARK OFFICE
CERTIFICATE OF CORRECTION

PATENT NO. : 5,287,629

DATED : February 22, 1994

INVENTOR(S) : Bo PETTERSSON

It is certified that error appears in the above-identified patent and that said Letters Patent is hereby corrected as shown below:

IN THE ABSTRACT: (Title page, item [57])

Line 1, after "it" insert --,--;

line 6, after "head" insert --,--; and line 10, after "beam" insert --,--.

IN THE CLAIMS:

Column 9, line 11, delete ", preferably against a".

Signed and Sealed this

Nineteenth Day of July, 1994

*Attest:*

BRUCE LEHMAN

*Attesting Officer*     *Commissioner of Patents and Trademarks*